(12) United States Patent   (10) Patent No.: US 7,985,917 B2
Morris et al.   (45) Date of Patent: Jul. 26, 2011

(54) AUTOMATIC ACCOMPANIMENT FOR VOCAL MELODIES

(75) Inventors: Dan Morris, Redmond, WA (US); Sumit Basu, Redmond, WA (US); Ian Simon, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 12/758,671

(22) Filed: Apr. 12, 2010

(65) Prior Publication Data

US 2010/0192755 A1 Aug. 5, 2010

Related U.S. Application Data

(63) Continuation of application No. 11/945,805, filed on Nov. 27, 2007, now Pat. No. 7,705,231.

(60) Provisional application No. 60/970,604, filed on Sep. 7, 2007.

(51) Int. Cl.
*G10H 1/06* (2006.01)
*G10H 1/38* (2006.01)

(52) U.S. Cl. ............... 84/637; 84/610; 84/616; 84/622; 84/625

(58) Field of Classification Search ............ 84/637
See application file for complete search history.

(56) References Cited

U.S. PATENT DOCUMENTS

| | | | |
|---|---|---|---|
| 5,003,860 A | 4/1991 | Minamitaka | |
| 5,164,531 A | 11/1992 | Imaizumi et al. | |
| 5,296,644 A | 3/1994 | Aoki | |
| 5,319,152 A | 6/1994 | Konishi | |
| 5,322,966 A * | 6/1994 | Shimaya | 84/637 |
| 5,510,572 A * | 4/1996 | Hayashi et al. | 84/609 |
| 5,521,324 A | 5/1996 | Dannenberg et al. | |
| 5,612,501 A | 3/1997 | Kondo et al. | |
| 5,719,346 A | 2/1998 | Yoshida et al. | |
| 5,756,916 A | 5/1998 | Aoki et al. | |
| 5,777,253 A | 7/1998 | Kurebayashi | |

(Continued)

FOREIGN PATENT DOCUMENTS

WO WO2006039992 A1 4/2006

(Continued)

OTHER PUBLICATIONS

"Chord Composer 6.12", at <<http://chord-composer.en.softonic.com/>>, Softnonic, 2007, pp. 1.

(Continued)

*Primary Examiner* — Elvin G Enad
*Assistant Examiner* — Christopher Uhlir
(74) *Attorney, Agent, or Firm* — Lee & Hayes, PLLC

(57) ABSTRACT

A graphical user interface for facilitating generation of an accompaniment for a recorded audio melody is described. A Hidden Markov Model, trained with blended chord transition matrices and melody observation matrices, is used for providing the accompaniment for the recorded audio melody. The recorded audio melody includes segments. Frequency analysis of the recorded audio melody is performed. The total duration of each fundamental frequency within a segment of the melody is summed. Based on the summing, a probability for each possible chord for each segment is computed. Based on the computed probabilities, a set of chords are selected for the segments. The chords are displayed on a chord chart of the graphical user interface. The graphical user interface facilitates various manipulations using the chords and/or controls, and generation of a new accompaniment for a recorded audio melody based on the manipulations.

20 Claims, 11 Drawing Sheets

U.S. PATENT DOCUMENTS

| | | | |
|---|---|---|---|
| 5,852,252 A | 12/1998 | Takano | |
| 5,939,654 A * | 8/1999 | Anada | 84/610 |
| 6,080,926 A | 6/2000 | Matsuda | |
| 6,215,059 B1 | 4/2001 | Rauchi et al. | |
| 6,423,893 B1 | 7/2002 | Sung et al. | |
| 6,633,845 B1 | 10/2003 | Logan et al. | |
| 6,852,918 B2 | 2/2005 | Kondo et al. | |
| 2002/0035915 A1 | 3/2002 | Tolonen et al. | |
| 2002/0194984 A1 | 12/2002 | Pachet | |
| 2004/0025671 A1 * | 2/2004 | Mack | 84/613 |
| 2004/0089141 A1 | 5/2004 | Georges et al. | |
| 2004/0144238 A1 | 7/2004 | Gayama | |
| 2004/0244565 A1 | 12/2004 | Cheng et al. | |
| 2006/0075881 A1 * | 4/2006 | Streitenberger et al. | 84/609 |
| 2006/0075884 A1 | 4/2006 | Streitenberger et al. | |
| 2006/0107825 A1 | 5/2006 | Hiratsuka | |
| 2006/0230910 A1 | 10/2006 | Song et al. | |

FOREIGN PATENT DOCUMENTS

| | | |
|---|---|---|
| WO | WO2006112584 A1 | 10/2006 |
| WO | WO2006118405 A1 | 11/2006 |

OTHER PUBLICATIONS

Haruto, "Automatic Accompaniment System of MIDI Performance Using HMM-Based Score Following", at <<http:// sciencelinks.jp/j-east/article/200622/000020062206A0748095.php>>, Japan Soience and Technology Agency, 2007, pp. 1.

"Introducing Harmony Engine—Vocal Modeling Harmony Generator", at <<http://www.antarestech.com/products/harmony_engine.shtml>>, Antares Audio Technologies, 2007, pp. 5.

Jordanous, "Score Following Making an artificially intelligent piano accompanist", retrieved on Feb. 18, 2009 at <<http://www.informatics.sussex.ac.uk/users/akj20/msc/slides/scorefollowingprint.pdf>>, Jul. 24, 2007, 17 pages.

Jordanous, "Score Following: An Artificially Intelligent Musical Accompanist", retrieved on Feb. 18, 2009 at <<http://www.informatics.sussex.ac.uk/users/akj20/msc/thesis.pdf>>, University of Edinburgh, Jul. 2006, pp. i-viii and 1-114.

Pardo, et al., "Modeling Form for On-line Following of Musical Performances", retrieved on Feb. 18, 2009 at <<www.cs.northwestern.edu/~pardo/publications/pardo-birmingham-aaai-05.pdf>>, Proceedings of the Twentieth National Conference on Artificial Intelligence, Pittsburgh, Pennsylvania, Jul. 9-13, 2005, 6 pages.

Schwarz, et at., "Robust Polyphonic Midi Score Following with Hidden Markov Models", available at least as early as Sep. 24, 2007, at <<http://recherche.ircam.fr/equipes/analyse-synthese/schwarz/publications/icmc2004/scofo-midi.pdf>>, pp. 4.

Yoshihara, et al., "Classifying Polyphony Music Based on Markov Model", retrieved on Feb. 18, 2009 at <<http://www.springerlink.com/content/a84qk6385717645h>>, Ideal 2006, Springer-Verlag, 2006, pp. 697-706.

* cited by examiner

TABLE 510

|  | C | C# | D | D# | E | F | F# | G | G# | A | A# | B |
|---|---|---|---|---|---|---|---|---|---|---|---|---|
| ...all chords... | | | | | | | | | | | | |
| C major | 40 | 94 | 144 | 38 | 95 | 148 | 180 | 46 | 72 | 145 | 53 | 51 |
| C minor | 174 | 194 | 127 | 32 | 108 | 46 | 124 | 166 | 130 | 112 | 155 | 190 |
| C aug | 71 | 149 | 134 | 155 | 59 | 43 | 143 | 174 | 182 | 95 | 96 | 119 |
| C dim | 73 | 51 | 168 | 119 | 51 | 60 | 185 | 68 | 74 | 129 | 64 | 180 |
| C sus | 51 | 110 | 44 | 57 | 46 | 141 | 184 | 137 | 42 | 111 | 140 | 195 |
| C# major | 133 | 124 | 148 | 183 | 193 | 138 | 141 | 146 | 163 | 94 | 79 | 115 |
| C# minor | 189 | 138 | 99 | 146 | 147 | 108 | 144 | 127 | 192 | 123 | 171 | 183 |
| C# aug | 110 | 165 | 195 | 170 | 197 | 118 | 31 | 139 | 81 | 168 | 149 | 116 |
| C# dim | 52 | 89 | 123 | 137 | 173 | 54 | 32 | 57 | 90 | 159 | 168 | 65 |
| C# sus | 70 | 97 | 134 | 155 | 108 | 50 | 66 | 193 | 59 | 35 | 102 | 125 |
| ...all chords... | | | | | | | | | | | | |

Excerpt from a melody observation matrix

FIG. 5

AUTOMATIC ACCOMPANIMENT FOR VOCAL MELODIES

RELATED APPLICATIONS

This application is a continuation of U.S. patent application Ser. No. 11/945,805, filed Nov. 27, 2007, now U.S. Pat. No. 7,705,231 which claims the benefit of U.S. Provisional Application No. 60/970,604, filed on Sep. 7, 2007, both of which are herein incorporated by reference in their entirety. Any disclaimer that may have occurred during the prosecution of the above-referenced application(s) is hereby expressly rescinded, and reconsideration of all relevant art is respectfully requested.

BACKGROUND

Songwriting is a craft typically restricted to experienced musicians—and in fact even the vast majority of musicians lack the type of expertise that enables composition. But a much larger set of people enjoy music, and enjoy singing along with the radio. This group might be inclined to write music—in fact might tremendously enjoy writing music—if it didn't require years of instrumental and theoretical training and/or practice. Various exemplary technologies are described below that enable a non-musician (e.g., a creative person with at least some limited singing ability) to get a taste of songwriting and walk away with his or her own song. While some of the technologies are aimed at non-musicians, other exemplary technologies can aid musicians (e.g., professional musicians and composers).

SUMMARY

A method for generating an accompaniment for a recorded audio melody includes providing a recorded audio melody that includes segments; performing a frequency analysis of the recorded audio melody; summing the total duration of each fundamental frequency within a segment; based on the summing, computing a probability for each possible chord for each segment; based on the computed probabilities, selecting a set of chords for the segments; and outputting the set of chords as an accompaniment for the recorded audio melody. Various other methods, devices, systems, etc. are also disclosed.

BRIEF DESCRIPTION OF THE DRAWINGS

Non-limiting and non-exhaustive embodiments are described with reference to the following figures, wherein like reference numerals refer to like parts throughout the various views unless otherwise specified.

FIG. 5 is an excerpt of an exemplary melody observation matrix table.

DETAILED DESCRIPTION

Various exemplary technologies described herein pertain to generation of accompaniment music given a live or recorded melody line. Various examples are aimed at someone who is not a musician, but wants to sing and has a little creativity (e.g., someone that likes karaoke). Such a person may not play an instrument so even if the person had a fantastic melody in her head, she may not know what to do with it. Another person may simply want to come up with a little jingle to go with a PowerPoint® presentation (Microsoft Corporation, Redmond, Wash.), want to write a song for a significant other, or maybe just want to sing and show the world on YouTube®. An exemplary system allows a person to realize any of these examples by singing a melody into a microphone and clicking "accompany me" on a user interface of the system. In response, the system outputs what the person just sang plus a backing track (i.e., accompaniment). The backing track can include chords, instruments and all. While various examples refer to singing (i.e., voice as an instrument), such a system may receive as input a melody from an instrument (e.g., a saxophone, trumpet, etc.).

An exemplary mechanism takes a recorded vocal melody and selects chords to accompany that melody. An exemplary user interface encapsulates such functionality, and additional functionality is useful to musicians in addition to the primary "non-musician" target user.

Described below are details on each of the following items, including specific exemplary mechanisms: An exemplary harmony modeling mechanism learns how to map melodies to chords from training data; an exemplary accompaniment generation mechanism combines the learned information about songwriting with a provided vocal melody to select a chord pattern; an exemplary user interface mechanism provides for access to an exemplary automatic accompaniment system; and a so-called "My Song—Musician's Edition" set of exemplary features enhance other components and can tailor a system to musicians and songwriters.

Figure 1:
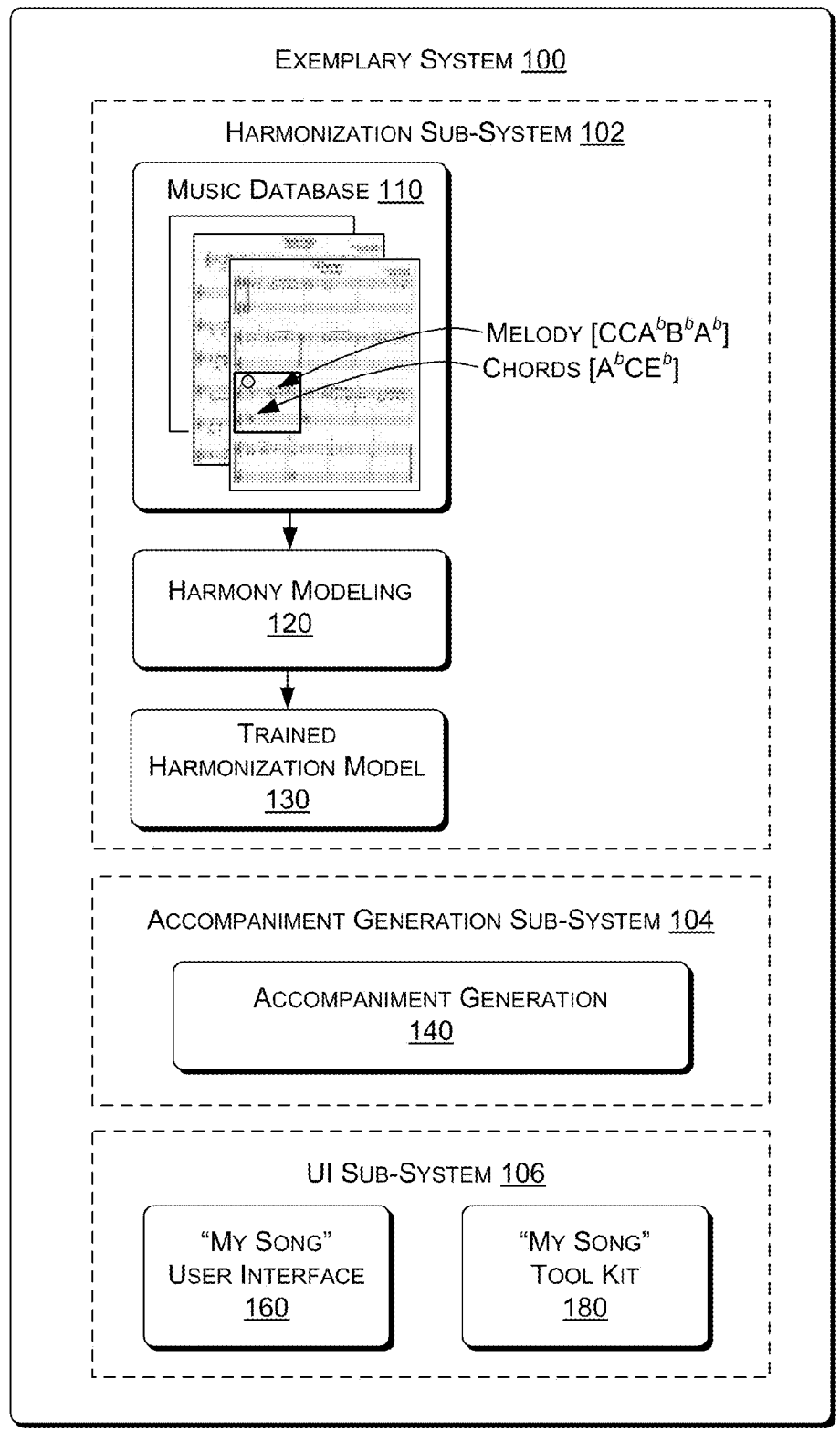
FIG. 1 is a diagram of an exemplary system that includes modules for training a harmonization model and for automatically generating an accompaniment (e.g., audio, sheet music, etc.) using a trained harmonization model.

FIG. 1 presents an exemplary system 100 at a high level with various sub-systems a harmonization sub-system 102, an accompaniment generation sub-system 104 and a user interface (UI) sub-system 106. The harmonization sub-system 102 (e.g., a harmony modeler) processes a musical database 110 to learn harmonization rules. The music database 110 includes melody and chords (e.g., triads or other chord forms). The sub-system 102 typically operates without any direct interaction with an end user. The sub-system 102 performs harmony modeling 120 to provide a trained harmonization model 130.

The accompaniment generation sub-system 104 (e.g., an accompaniment generator) includes an interactive accompaniment generation application 140 that, for example, records voice input or receives recorded voice input (e.g., depending on configuration of the sub-system 104) and uses the rules output (e.g., trained model 130) from the harmonization sub-system 102 to select chords to accompany the voice input. Depending on configuration of the accompaniment generation sub-system 104, the module 140 may provide for playback of these chords or playback of these chords with the recorded voice. While this example refers to voice input or recorded voice input, a melody may be from a musical instrument other than voice.

Figure 2:
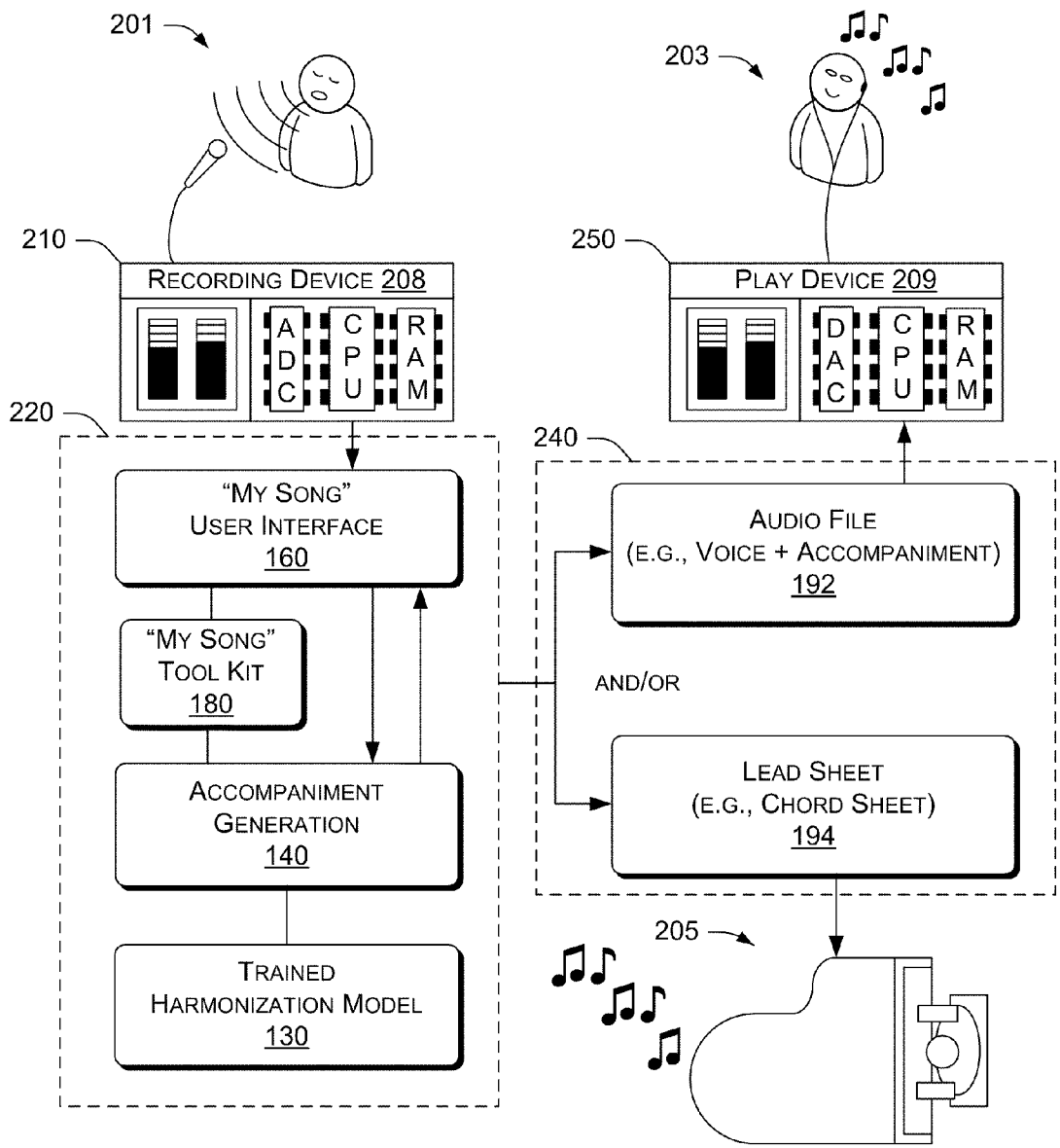
FIG. 2 is a diagram of an exemplary method for generating an accompaniment (e.g., audio, sheet music, etc.) based on a melody.

FIG. 2 shows an exemplary method 200 along with various components of the system 100. According to the method 200, a record step 210 records sound of a user 201 as the user 201 sings into a microphone of a recording device 208. In this example, the recording device 208 may be a computer-based recording device (e.g., audio card, audio chip, etc., associated with a computer) or a standalone recording unit that generates a digital output (e.g., stream or file). A chord selection step 220 receives digital audio, for example, via instruction entered via the UI 160. The chord selection step 220 then generates backing music (i.e., an accompaniment) using the accompaniment generation module 140, which relies on the trained harmonization model 130.

According to the example of FIG. 2, an output step 240 outputs the backing music as an audio file 192 (e.g., alone or voice melody plus accompaniment) and/or outputs the backing music as a lead sheet 194 (e.g., alone or with the melody). In a playback step 250, the audio file 192 is played using the play device 209 and enjoyed by listener 203 where listener 203 may be the same person as the singer 201. Where output is a lead a sheet, an instrumentalist may play the accompaniment on an instrument 205.

An exemplary system optionally includes a recording device and/or a play device, which may be a single device. In the example of FIG. 2, the recording device 208 includes an analog to digital converter, a processor and memory and the play device 209 includes a digital to analog converter, a processor and memory. A computer or computing device may include modules (hardware and/or software) to record, play, generate and output as described with respect to FIG. 2. Such a device may optionally train a harmonization model. In many instances, training of such a model (e.g., model 130) occurs elsewhere and the trained model is provided to a user for use by an accompaniment generation module (e.g., module 140).

A harmony modeler basically answers the question "What do good accompaniment patterns look like?" An exemplary approach assumes that a pattern of chords captures the musical essence of a song, which is a suitable assumption for "pop-like" target genres (e.g., pop, rock, country, R&B, etc.). For other genres of music (e.g., classical composition, heavy metal, opera, etc.) other approaches may be used. Importantly, for target genres, a "lead sheet"—a melody plus a set of chords—essentially provides all the information necessary for a musician to stand in (e.g., piano, keyboard, guitar, etc.) and accompany a singer.

As mentioned with respect to FIG. 1, the exemplary harmonization sub-system 102 includes use of machine learning techniques to examine a database of lead sheets and capture the essential information necessary to later take a new melody and produce suitable chords. An exemplary process is described below, which concludes with a brief summary of a harmony modeling process.

Preprocessing

The harmony modeler's first step is to make some notational adjustments to the music database that will simplify further analysis. Given a database of songs (e.g., in a MusicXML format or other data format specifying chords and melody), the harmony modeler first selects a single chord to represent a segment of a song in the database. In general, such an approach sums all notes for a segment and associates these notes with a single chord. A chord could last 10 measures or one sixteenth-note, as long as the total counts for each pitch are properly summed.

Hence, a chord may last a single "measure" or a chord may extend over multiple measures. Similarly, smaller units are possible. For example, if a song is scored in 4/4 time (4 beats per measure) but often contains two chords per measure, an appropriate segment could be two quarter notes. Settings may be adjusted to define the smallest segment. For example, a setting may ignore extremely rapid chord changes (e.g., more than two chords per measure in the original score). Such an approach can be justified as such rapid changes often generally represent instrumental movement rather than essential melody harmonization.

Figure 3:
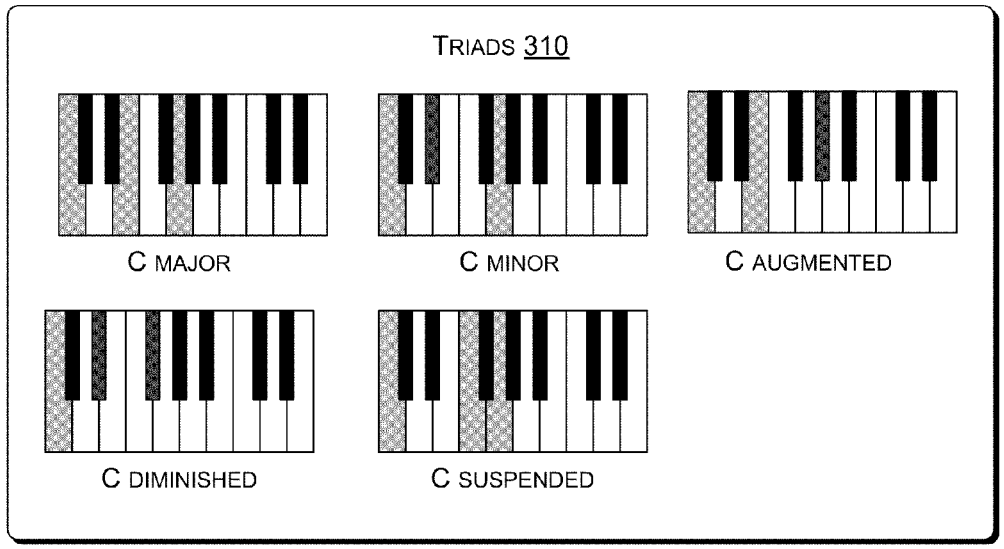
FIG. 3 is a diagram of triads and an excerpt of an exemplary chord transition matrix table.

As the music database is a finite database, trying to learn harmonization patterns for every possible chord (e.g., 7ths, 9ths, 11ths, 13ths, augmented sixths, etc.) could reduce the amount of data for each chord type. Hence, chords can be optionally simplified to triads where, for example, chords are reduced to either major, minor, augmented, diminished, or suspended chords. FIG. 3 shows triads 310 for major, minor, augmented, diminished and suspended chords, which are the four qualities of triads. A triad's quality is determined by the intervals it contains. For instance, a major triad contains a major third from its root to its third and a minor third from its third to its fifth. Also the interval from its root to its fifth is a perfect fifth. Reducing all chords to triads can increase the number of each chord type that can be observed in a finite database, and is an approach consistent with the fact that, for example, the harmonization rules for a minor chord are expected to apply equally well to a minor-seventh chord.

Since harmonization rules are expected to be independent of the key a song is in, all songs (including chords and melody) are then transposed into the same key. The examples in FIG. 3 are in the chosen key of C for notational convenience. The input database is assumed to be labeled in terms of its original key, so transposition is a trivial operation. Note that here the term "key" is used to simply mean the number of sharps or flats in the key signature; further below the description addresses the fact that the same key signature can refer to a major mode and a minor mode. In an exemplary approach, if a song changes key in the original database, each single-key section is essentially treated as a separate song.

While the foregoing example relies on a music database, an alternative approach can be rule based. For example, rules may be established from analysis of a music database or more simply taken from a text on music theory. Rules may depend on any of a variety of factors (e.g., period in time, ethnic origin, instrument limitations, etc.). In this alternative approach, learning chord transition patterns is optional.

Learning Chord Transition Patterns

FIG. 3 also shows a chord transition table 320 that includes learned chord transition patterns, which is the harmony modeler's next step. This step proceeds by learning the rules governing transitions among chords in a song, independent of melody. To do this, the harmony modeler examines the chord changes in each "song" (noting a song may be split) and counts the number of transitions observed from every chord to every other chord. That is, it builds a table (see, e.g., the table 320 of FIG. 3) where each element represents the number of times the chord in a given row was observed transitioning to the chord in a given column in the entire database. This database has rows and columns for each chord type at each root note (C, C#, etc.), plus a row for "beginning of song" and a row for "end of song", for a total of (12 *5)+2=62 rows and 62 columns. In the example of FIG. 3, the table 320 is the first of two tables output by the harmony modeler.

Figure 4:
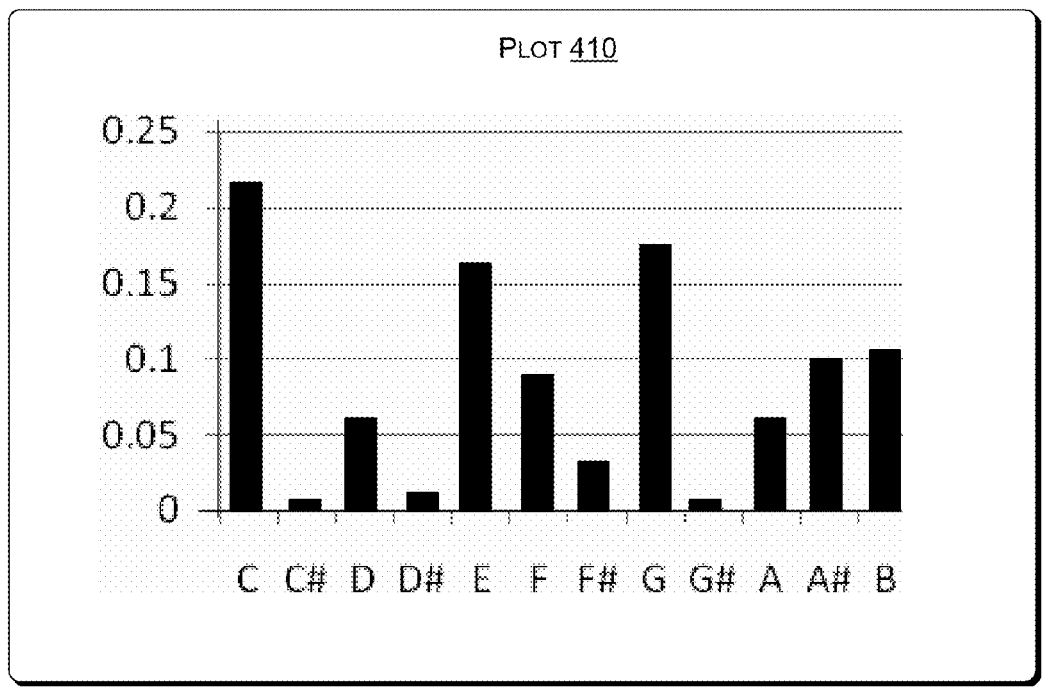
FIG. 4 is a plot to illustrate graphically a note distribution vector.

An individual row of this table can be normalized to compute the probability of each possible chord following a known chord—$P(C_{i+1=C1}|C_{i=C2})$—in a new accompaniment pattern. This helps to answer questions like "If a song is playing a B major chord right now, what is the probability that the next chord will be an F# major chord?" As shown in FIG. 4, this note distribution vector can also be intuitively represented graphically and might look like the plot 410 for a given chord. In musical terms, this might represent the note distribution for a C major chord, since the notes "C", "E", and "G" (the notes that make up a C major chord) were particularly common over this chord (all above 0.1).

Learning Melody Harmonization Rules

Learning melody harmonization rules occurs next where the harmony modeler builds a representation of the rules governing which notes are associated with each chord type. To do this, the harmony modeler examines each measure in each song and sums the total duration of each pitch occurring in the melody within that measure. This may include notes that start in a previous measure or extend into the subsequent measure, but only the duration of each pitch occurring in the examined measure is included in the sum as a measure is processed. Durations are summed in units of one measure, so for example a quarter-note in a song in 4/4 time will be assigned a duration of 0.25. To allow staccato notes to have a reasonable impact on the system, all notes less than one beat long are extended to be one beat long or to last until the subsequent note—whichever is shorter—before summing.

Since each measure has a unique chord assigned to it at this point (see preprocessing above), these summed pitch durations are then inserted into a table containing the total duration of each pitch observed over each chord for all songs in the database. FIG. 5 shows a table 510 as an approximate representation of such a table where each element represents the total duration (in the entire database) that the note in a given column was observed over the chord in a given row. Such a table is referred to this table as the melody observation matrix.

The harmony modeler then normalizes each row of this table so it sums to 1.0, and is left with the probability that one would see each pitch if looked upon at one instant in time during which a given chord is being played. This approach helps to answer questions like "If a song is playing a B major chord right now, what is the probability that the melody is playing the note F#?" Many combinations of notes and chords will have no observed data, e.g., one may have never seen a C# pitch over a (rare) Caug chord, so the harmonizer adds a few "imaginary" instances of every note observed for a short duration over every chord. These imaginary note durations are very small relative to the real note durations, but have the effect of removing zeros in this table and smoothing the distribution somewhat. This type of "imagined" observation is known in machine learning terms as a "conjugate prior".

Major/Minor Separation

An exemplary method includes a major/minor separation technique. In practice, popular music exhibits distinctly different chord transition matrices and melody observation matrices for songs in major and minor keys. In an exemplary approach, the harmony modeler thus separates the entire database into two separate databases before performing the above steps, and produces two separate chord transition matrices and two separate melody observation matrices (i.e., one for major keys and one for minor keys).

Musical databases are generally labeled in terms of their key signature, but are generally not labeled in terms of their "mode"—that is, whether that key signature represents a major or minor key. Thus, an exemplary automated procedure for separating a database into major and minor sub-databases can be used. This procedure begins by initializing each song with a "guess" as to its major- or minor-ness, according to the following heuristics:

1. Relative frequency of C and Am chords;
2. Relative frequency of F and Dm chords (subdominants); and
3. Relative frequency of G->C and E->Am transitions (cadences).

Using these initial heuristics, the database can be separated into "major" and "minor" songs. A chord transition matrix and melody observation matrix for can then be built for both sub-databases. An exemplary approach then looks at every song in the database and computes the probability of every chord transition (using both chord transition matrices) and every set of notes observed over each chord (using both melody observation matrices). Regardless of a song's original classification (major or minor), this approach now labels it a major-key song if the probability of chords and notes for this song is higher using the major-key matrices than using the minor-key matrices. Next, new matrices can be built using the new mode assignments and the process repeated, which continues until no song changes its classification from major to minor or vice-versa. The result is a reliable classification of songs into major and minor keys, and the final output from the harmony modeler is the chord transition matrices for each key (major and minor) and the melody observation matrix for each key (major and minor).

An exemplary harmony modeling process includes selecting a single chord for each measure; simplifying chords to triads; transposing songs into the key of C; counting the number of transitions observed from every chord to every other chord to build the chord transition matrix; examining each measure in each song and summing the total duration of each pitch occurring in the melody within that measure; building the melody observation matrix using the summed pitches; normalizing the rows of the melody observation matrix and adding a conjugate prior; and iteratively performing this procedure on two sub-databases to separate the entire database into major and minor songs, producing separate matrices for each class.

An exemplary method includes inputting note and chord information from a music database, training a Hidden Markov Model (HMM) using the note and chord information wherein the HMM includes states that correspond to chords and identifying a state transition matrix as being associated with a style of music in the music database. Such a method can further include identifying multiple state transition matrices where each state transition matrix is associated with one or more styles of music in the music database. While this approach uses a HMM, training may occur using other approaches. As described below, a trained HMM can be used in accompaniment generation (see, e.g., trained model 130 of FIGS. 1 and 2).

Accompaniment Generator

The accompaniment generator (see, e.g., FIGS. 1 and 2), basically receives melody as an input and then selects chords to accompany the received melody. The form of output, as explained with respect to FIG. 2 can vary (e.g., audio, audio file, sheet music, etc.). In general, generation of an accompaniment occurs only after receipt of a melody. Thus, accompaniment generation can be viewed as a second stage of the system 100.

In an exemplary method, the accompaniment generator uses matrices output by a harmony modeler to select backing chords for a voice (audio) track (e.g., backing track or simply accompaniment). The output from the generator module is a set of chords, for example, equivalent to what would be included in a "lead sheet" or "fake book" to accompany a melody.

In an example described below, the following assumptions are made:

1. The voice track being analyzed was performed along with a "click track" and was at a consistent tempo (i.e. it is not necessary to extract timing information from the voice track). In other words, the exact measure boundaries are known in the vocal track; and 2. The user has specified the number of chord changes that should occur per measure at the selected tempo (one chord change per measure describes most songs in a demonstration database fairly well).

With respect to measure boundaries, a voice track (e.g., a recorded audio melody) can include any of a variety of information to identify measures (e.g., measure boundaries). Further, techniques exist to segment a recorded melody into measures or beats, which can be used for purposes of accompaniment generation.

Pitch-Tracking

The steps used in an exemplary accompaniment generation procedure are described below, which concludes with a brief summary. An accompaniment generator's initial task is typically computation of the pitch of the voice supplied in the voice track. The pitch can be computed using an autocorrelation technique (see, e.g., Boersma, 1993: "Accurate short-term analysis of the fundamental frequency and the harmonics-to-noise ratio of a sampled sound." *Proceedings of the Institute of Phonetic Sciences* 17: 97-110. University of Amsterdam) that computes the fundamental frequency at a series of time points in an audio track. For purposes of demonstration, computation occurred at a frequency of 240 time points per measure (an arbitrary number, while noting that the frequency samples are, in general, much shorter than meaningful musical notes).

In general, a generation technique does not necessarily attempt to convert a frequency pattern into a musical representation (e.g. a MIDI melody) and it does not necessarily try to extract note durations or timing. A frequency pattern is typically somewhat noisy but tends to center around an intended pitch—or at least will contain some content at an intended pitch—for most singers; this provides some robustness to minor pitch errors that would be lost if all pitches were discretized into a MIDI-like representation at musically-meaningful time scales. An approach can further discard octave information (i.e., all pitches are shifted into a single octave), both because octave information is not likely to be musically relevant and because octave errors are very common in pitch-tracking, rendering octave information unreliable.

With respect to pitches, it is likely that they will not line up precisely with standard musical note frequencies because, for example, the user was not singing along with a backing track and may be slightly offset in pitch from a "proper" musical key. For each time point, a generation technique finds the distance between the frequency output by the frequency-tracker and the nearest musical note. Such an approach takes the average of this distance over all the frequencies output by the frequency-tracker and shifts all the frequencies by this average. This approach represents a best effort to shift the pitch of the entire voice track so it lines up optimally with standard musical notes, without warping the voice track.

Computing Chord/Melody Probabilities at Each Measure

Given pitches for the melody, an exemplary generator computes chord/melody probabilities at each measure. For example, for each measure in the input voice track, the generator can sum the total duration of each note occurring within a measure. This technique gives a 12-element vector x that is equivalent in form to the rows of the melody observation matrix computed by the harmony modeler (see above). For purposes of explanation, an assumption is taken that the song is in a major key and that it is appropriate to use the corresponding observation and transition matrices. Further below, a description is given as to how this technique can be generalized to both major and minor melodies.

Given a measure of pitch values, and assuming a particular distribution from which pitch values are drawn (e.g., assume a multinomial distribution), a computation occurs for the probability that this measure of melody would occur if the current chord were each of the sixty possible chords (12 root notes*5 chord types). An assumption is made that there is some chord supporting this melody, but chord is not known. Each of these probabilities is referred to as $p_{melody|chord}$ or P(melody=x|chord=c).

This approach answers questions like "If the current chord is b minor, how likely is the current set of notes?" If the only thing to look at for the current measure was the melody, one would select the chord at each measure that has the highest posterior probability:

$$p(chord|melody)=[p(melody|chord)*p(chord)]/p(melody)$$

Since p(melody) will be equal for all chords, an exemplary generation technique can select the chord that has the highest numerator in the foregoing expression.

Since an exemplary approach integrates information over all the available chords to compute the posterior, though, the approach only stores a list containing all sixty of the likelihoods p(chord|melody) for each measure in the vocal track.

The melody observation matrix reflects songs that were transposed into the key of C, so an implicit assumption for the moment is that the melody being examined is also in the key of C. There is no reason that this key is more likely than any other key (since the vocal input represents a user singing with no backing track). Further below, a technique is explained to generalize to all possible keys.

Selecting the Best Chord Sequence

An exemplary accompaniment generator aims to select the best chord sequence for a melody. As described herein, an exemplary accompaniment generator uses a first-order Hidden Markov Model (HMM) to model the song, where each hidden node represents one measure, the possible states are the sixty possible chords, and the observed data are the pitch vectors x at each measure (e.g., histogram pitch values). The Viterbi Algorithm (commonly used in HMM approaches) can be used to compute the most likely sequence of chords, i.e., the sequence of chords that maximizes the likelihood of the observations. State transition probabilities are drawn directly from the chord transition matrix, and generation probability computation (the likelihood) proceeds as already described.

In an HMM-based approach, a melody can be represented as a series of segments, which may be equal or unequal in duration. For example, one segment may be a half note while another segment is two whole notes (e.g., two measures). A segment may be referred to as a "timestep" in the HMM approach where each timestep has an observation node (e.g., observed information) and a hidden node. Observed information may be in any of a variety of forms. As discussed below, observed information may be organized according to a frequency analysis performed on a melody. In such an approach, each segment of the melody (i.e., "timestep") can have a corresponding observation histogram of pitch values. In HMM terminology, pitch values may be input as pitch vectors or "note" vectors.

Figure 6:
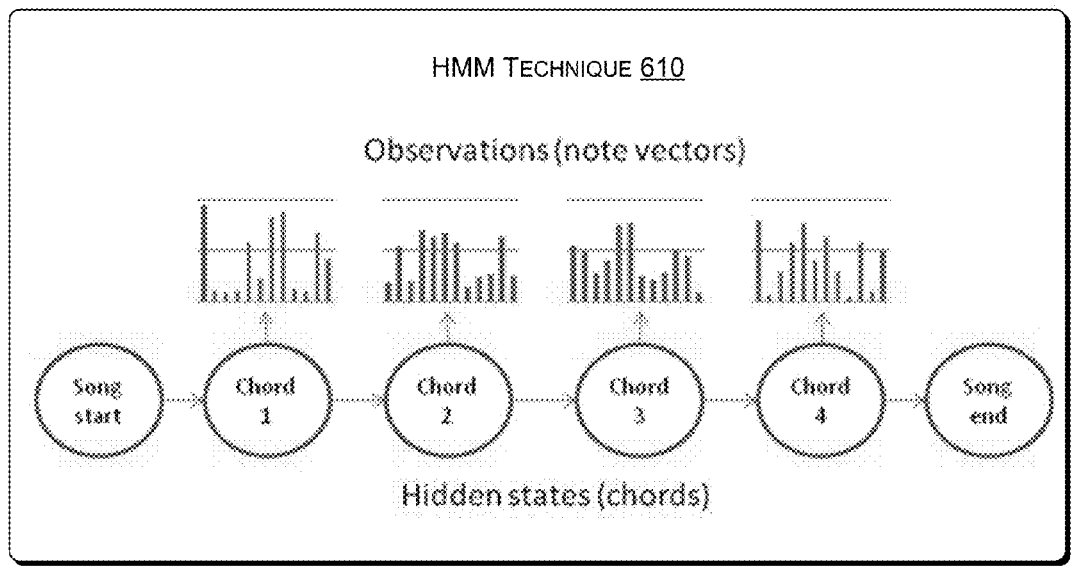
FIG. 6 is a diagram of an exemplary Hidden Markov Model technique along with note distribution plots for four measures and hidden states that represent chords with a relationship of one chord for each of the four measures.

FIG. 6 shows a state diagram for an exemplary HMM-based technique 610 as it may appear running on a song with four measures or four segments. Remember that the transitions from "song start" to each possible chord—and the transitions from each possible chord to "song end"—were represented in a chord transition matrix, so these do not require special handling at this stage.

The total likelihood for the model can be written as:

$$P(melody1 \ldots melodyN|chord1 \ldots chordN) = P(chord1)*P(melody1|chord1)*P(chord2|chord1)* \ldots *P(chordN|chordN-1)*P(chordN|chordN)$$

In the log domain, this is $$\log P(melody1 \ldots melodyN|chord1 \ldots chordN) = \log P(chord1) + \log P(melody1|chord1) + \log P(chord2|chord1) \ldots + \log P(chordN|chordN-1) + \log P(chordN|chordN)$$

The Viterbi Algorithm selects the sequence of chords chord1 ... chordN that maximizes this total likelihood.

Computing the probability of each state in the forward part of the Viterbi procedure requires summing the log-probability of the observed notes given that this is the "correct" chord and the log-probability of the transition to this chord from each possible chord at the previous node. A weighting factor is introduced at this stage—the melody observation weight—that explicitly multiplies the log-probability of the observed notes. This observation weight—which can be optionally under the control of a user—helps an exemplary generator choose between "good chord progressions" (low observation weight) and "chords that very closely fit the input notes" (high observation weight). In practice a high value for this parameter makes the selected chords more "interesting" or "surprising", while a low value for this parameter tends to produce fairly conventional chord progressions.

The total likelihood with this weighting term can be written as follows:

$$\log P(melody1 \ldots melodyN|chord1 \ldots chordN) = \log P(chord1) + w_o \log P(melody1|chord1) + \log P(chord2|chord1) \ldots + \log P(chordN|chordN-1) + w_o \log P(chordN|chordN)$$

The output of this stage is an optimal sequence of chords to accompany the given melody, assuming the melody is in C major.

Key Determination

Thus far, it was assumed that the input melody was in the key of C major to allow for direct application of the data in the transition and observation matrices output by the harmony modeler. In practice, there is no reason to believe that the melody is in C or that it is a major-key melody, so an exemplary method repeats this entire procedure 24 times, once for the major and minor key at each root note (C major, C minor, C# major, C# minor, etc.), and chooses the key for which the optimal chord sequence (from Viterbi Algorithm) yields the highest overall likelihood. To generate accompaniment for a new major key, a circular shift occurs for the rows and columns of the entire observation and transition matrices by the distance between the new major key and the key of C (for example, shift the matrices by one position to try the key of C# major, by two positions to try the key of D major, etc.). To process a minor key, the minor-key observation and transition matrices are used where the same shift occurs according to the relative major key. For example, to generate accompaniment for the key of B minor, a shift of the minor-key observation and transition matrices occurs by two positions (because the key of D major, the relative major key to B minor, is two steps above C major).

For demonstration trials, an exemplary generation method ran extremely quickly for real songs, which indicates that the increased computation time required to process twenty-four keys is not a significant issue. In practice trials, the bulk of the time spent processing a melody was devoted to pitch-tracking, which does not need to be repeated for each possible key.

An exemplary generation method selects the key that produces the highest-likelihood output, and returns, for example, to the user, the chords output by the HMM using that key.

Special Handling of Self-Transitions

An exemplary method may use a slightly modified chord-transition matrix in an accompaniment-generation process. Such a method can address music databases that tend to have numerous examples of "self-transitions": successive measures containing the same chord. These transitions tend to be heavily favored when generating chords and without intervention, or modification, a system can generate a repetitive sequence that contains only a single chord for many input melodies. As described herein, an exemplary method introduces a self-transition weight (less than one, and in practice either zero or very close to zero) to multiply every diagonal entry in the chord-transition matrix. This causes an accompaniment generator to select self-transitions only when they dramatically improve the "fit" of the melody or the quality of the chord progression.

Overview of an Exemplary Accompaniment Method

An exemplary accompaniment generation method computes the fundamental frequency at each time point in a recorded audio track; discards octave information; computes an optimal pitch shift to approximately align the pitch information with standard musical notes; for each measure in the input voice track, sums the total duration of each note occurring within a measure; computes p(melody=x|chord=c) for each possible chord at every measure; uses the Viterbi algorithm to select the best set of chords in every possible key; selects the key for which the optimal chord sequence (from the HMM) has the highest likelihood; and returns the corresponding chords to the user.

As described herein, an exemplary method for generating an accompaniment for a recorded audio melody includes providing a recorded audio melody that includes segments; performing a frequency analysis of the recorded audio melody; summing the total duration of each fundamental frequency within a segment; based on the summing, computing a probability for each possible chord for each segment; based on the computed probabilities, selecting a set of chords for the segments; and outputting the set of chords as an accompaniment for the recorded audio melody.

"My Song" Exemplary User Interface

Figure 7:
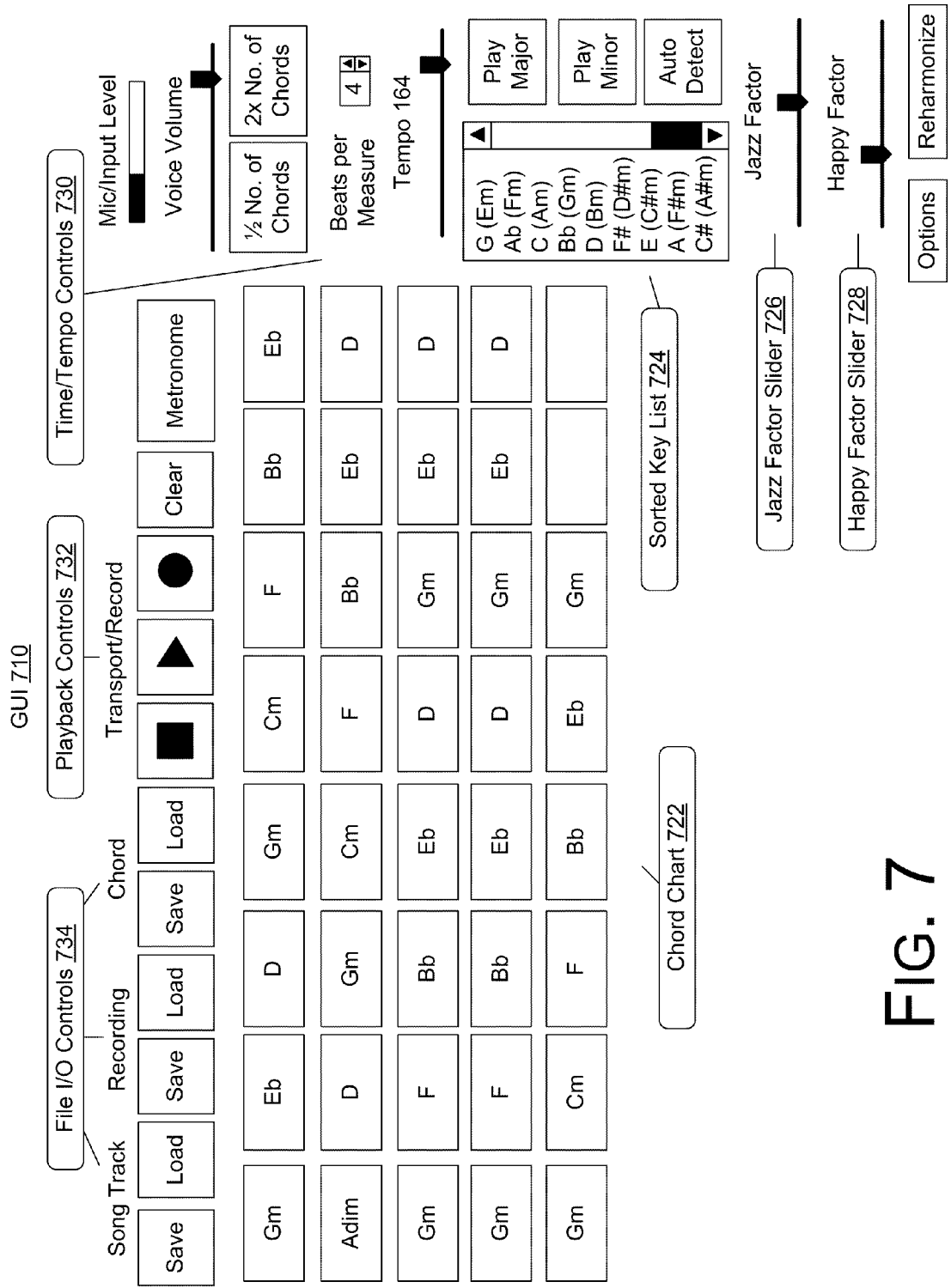
FIG. 7 is a diagram of an exemplary graphical user interface (GUI) for harmonizing a recorded melody.

An exemplary user interface makes an accompaniment generator available to a user. FIG. 7 shows an exemplary GUI 710 to highlight a few features that will be discussed below in more detail. At a basic level, the only user interface elements with which a user needs to interact are the playback/record controls 732 at the top of the window and the time/tempo controls 730. A user first drags the "tempo" slider of the time/tempo control 730 to the desired tempo; a metronome plays beats at the selected tempo as long as the user is interacting with this slider. The user then clicks "record" using the playback controls 732, at which point a metronome is initiated and a visual countdown displayed to the point at which the user should begin singing (equivalent to the typical "count-off" used by musicians to start a song). The user then sings a melody (while the metronome continues to play) and clicks "stop" at the playback controls 732, when the user is finished singing. At this point, an accompaniment generator is initiated to choose a key and to select chords, which appear in the "chord chart" area 722. The user can then click "play" at the playback controls 732 to hear the accompanied song. This simple interaction, enabled by the accompaniment generator, allows for input of a melody and generation of an accompaniment.

An exemplary accompaniment generator or device that receives out from an accompaniment generator may output audio data for the accompaniment using a very simple pattern generator that outputs MIDI events. Such MIDI events can be used to synthesize piano or other instrument notes using, for example, a computer's default MIDI synthesizer. For more rich output generation, a user interface for controlling chord generation may be provided.

Referring again to the GUI 710, once a user has recorded a voice track, there are several other interface elements with which the user can interact. For example, a "sorted key list" 724 displays all possible keys, sorted by the scores assigned to each key by an accompaniment generator (e.g., the score is the likelihood of the HMM for the optimal chord sequence given that key). The feature 724 can display the key that best fit the input vocal track as it is chosen by default. The feature 724 allows a user to experiment with multiple possible keys without having the musical intuition required to choose likely keys. Sorting keys by probability is important for allowing non-musicians to have some control over key determination. The user can click any key in the list and an associated accompaniment generator can be instructed to select new chords using that key and update the chord chart.

Per the time/tempo control 730, a user can quickly halve or double the number of chords selected per segment (e.g., measure or other division) by clicking the "double" and "halve" buttons. This feature allows a user to experiment with different chord change rates and allows a user to compensate for inherent ambiguity in a metronome's count-off (users often have in mind a desired chord change rate, but choose a tempo that corresponds to twice that rate or half that rate).

Per a "jazz factor" control 726, a user can manipulate the selected chords in real-time by moving a "jazz factor" slider, which directly controls the melody observation weight used by an accompaniment generator. This allows a user to bias the system toward "good chord progressions" (low observation weight) or toward "chords that very closely fit the input notes" (high observation weight). In practice a high value for this parameter makes the selected chords more "interesting" or "surprising", while a low value for this parameter tends to produce fairly conventional chord progressions. Each time this slider moves an instruction is issued to an associated accompaniment generator to select a new set of chords and to update the chord chart.

Per a "happy factor" control 728, a user can manipulate the selected chords in real-time by moving a "happy factor" slider. When this slider is anywhere other than all the way to the left or all the way to the right, the melody observation matrix and chord transition matrix used by the associated accompaniment generator do not directly correspond to either the major-key or minor-key matrices as was described above. Instead, the matrices used by the accompaniment generator are a linear combination of the logarithms of the major and minor matrices. This slider controls the blending between the major-key and minor-key matrices, which controls how "major" (happy) or "minor" (sad) the selected chords sound.

While an approach could linearly blend two transition matrices (major and minor) to produce a valid intermediate transition matrix, an exemplary approach blends the logs of the major and minor matrices using the blending factor specified by the "happy factor" slider (e.g., "log-space blending"). This approach produces a new matrix that is technically not a valid transition matrix (i.e., rows and columns do not necessarily add up to 1.0), but tends to emphasize the common regions of the major and minor transition matrices, producing a result that tends to be more musically valid.

An option can exist that allows a user to click "record" again, per control 732, to re-sing the user's melody while hearing the selected chords. In response, the user can either simply replace the vocal track (keeping the same chords) or replace the vocal track and reselect the chords. This allows the user to tailor the user's vocal performance to the chords, just as an accompaniment generator originally tailored the chords to the user's vocal performance.

A user can use file I/O controls 734 to save the chords to a text file (along with relevant parameters such as tempo and the state of all interface elements) or to save the recorded audio to an audio file. Other options may also exist for the output (e.g., for input to a music notation software program such as Finale®).

"My Song—Musician's Edition" Exemplary User Interface

Such a feature can assist a musician in writing songs, i.e., I can write songs, but you can help me do it faster or better. While an exemplary system for accompaniment generation can be configured with basic elements for sake of simplicity to satisfy a non-musician, additional features can make such a system incredibly useful for musicians wishing to experiment with accompaniment patterns (e.g., for work-in-progress melodies). Some of these exemplary additional features, or exemplary techniques for use with the already described features, are described below.

Rapid Exploration of Accompaniment Patterns

The aforementioned controls 724 and 726 allow for manipulation of various accompaniment generation parameters. As shown in FIG. 7, the provided sliders—the "jazz factor" slider and the "happy factor" slider—allow a user not only to control these specific parameters, but also to rapidly iterate over a huge set of different accompaniments for a melody. Even for a musician who can select chords quickly, the ability to generate completely new accompaniment patterns in seconds is unprecedented, and could help tremendously for a musician looking for creative interpretations of a melody. Thus, this tool or feature is quite useful for musicians.

Control Over Individual Chords

While a chord pattern in general is automatically generated, a musician's intuition may allow the musician to say "this pattern sounds good, but let me just change this one chord . . . " An exemplary feature allows a user to click on a chord to bring down a drop-down menu of all available replacement chords—sorted by their assigned probabilities—that allows the user to manually replace any chord in the pattern. When a chord is replaced, an instruction issued to an associated accompaniment generator can, optionally, re-generate the whole accompaniment pattern keeping this chord fixed; this chord may have an impact on the chords selected by the accompaniment generator for neighboring measures.

A musician might also be able to say "this one chord that was chosen sounds really interesting, but I'd like to experiment with other accompaniment patterns in general". An exemplary feature allows a user to right-click a chord to "lock" that chord, for example, so that changes to a UI slider(s) will not change this chord, but will take this chord into account when generating the neighboring chords. An exemplary graphical user interface includes a chord display to display chords selected by an accompaniment generator for harmonizing a recorded melody, a control to lock one or more of the chords in the chord display and a control to reharmonize the recorded melody without altering the one or more locked chords.

A musician (or possibly even a novice user) might want to put more rigorous constraints on "phrases", to constrain certain regions of the accompaniment pattern to have the same chords. For example, an exemplary feature allows a user to mark one segment as a verse, and another segment as a second verse, implying that these segments should have the same chords. Note that this is potentially very helpful for an accompaniment generator, since it can sum the pitch vectors from corresponding measures in multiple segments of the song to get a more reliable estimation of the pitch distribution in those measures (since the accompaniment generator wants to find the chords that best fit both examples of a "verse").

"My Song" Exemplary User Interface

Figure 8:
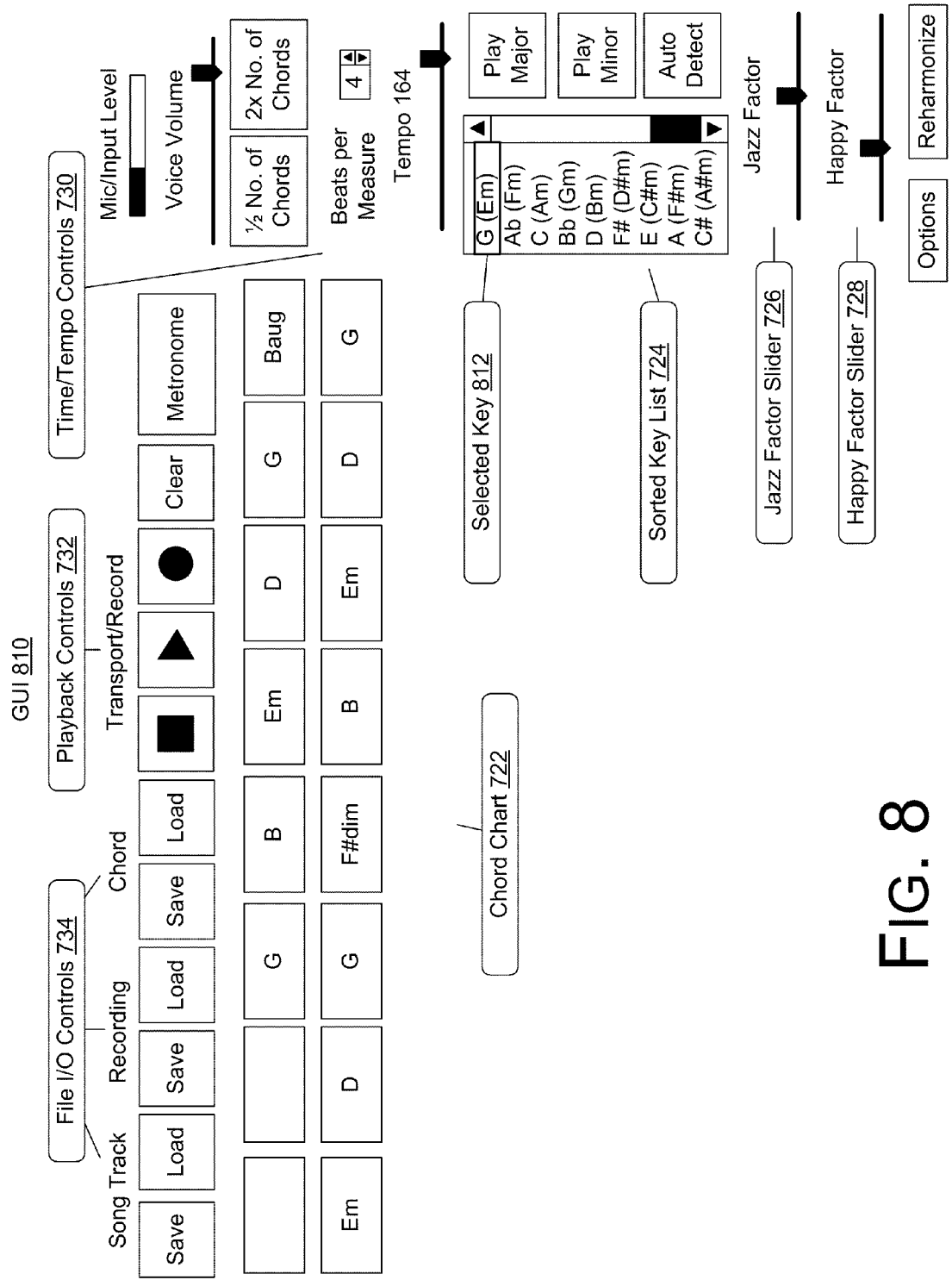
FIG. 8 is a diagram of an exemplary graphical user interface (GUI) for selecting a key for a harmonized recorded melody.

FIG. 8 shows another screen shot of an exemplary GUI 810. The GUI includes features of the GUI 710 with some rearrangement, which may be determined by a user.

"My Song" Exemplary User Interface Right Click Control

Figure 9:
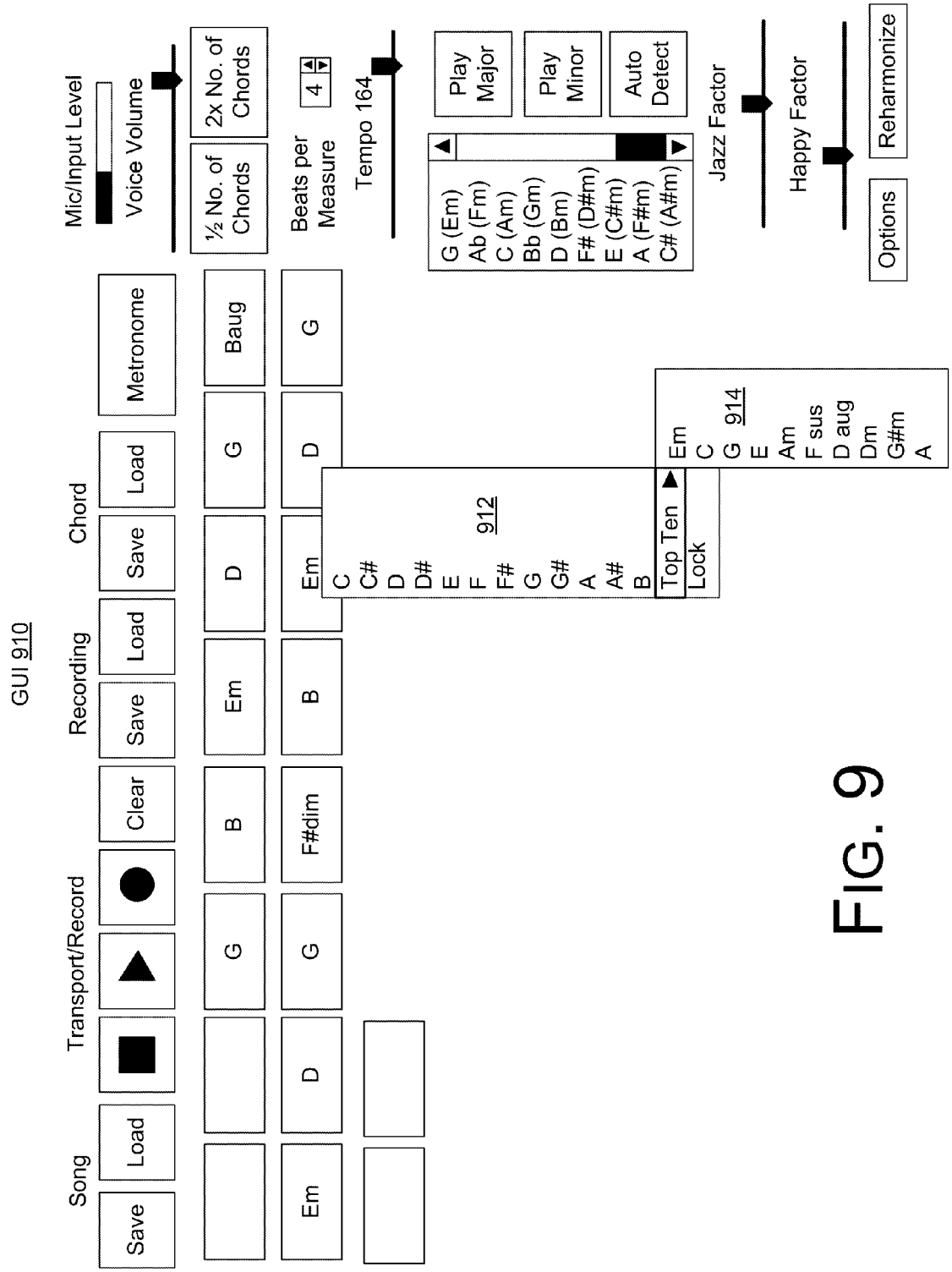
FIG. 9 is a diagram of an exemplary graphical user interface (GUI) for adjusting chords for a harmonized recorded melody.

FIG. 9 shows a screen shot of an exemplary GUI 910 that includes a right click control 912 that causes the GUI 910 to display a menu when a user right-clicks on a chord (e.g., using a mouse, other pointing device, keyboard command, vocal command, etc.). This feature allows a user to replace the chord selected with any other chord. While such a feature may have some interest, a more interesting feature is the control 914 for display of another listing: a "top ten" sub-menu. This sub-menu shows the top ten chords that the associated accompaniment generator "liked" for this spot the last time it ran its harmonization algorithm. This is tool allows a user to choose other chords that might fit well at a point in the song. In the example of FIG. 9, the GUI 910 includes another option, listed as the last option in the menu of the right-click control 912: "lock". This feature causes a "lock" of the current chord, so that as a user changes GUI parameters or asks to re-harmonize the song, the locked chord does not change. As mentioned, locking a chord can affect the chords around it. Specifically, an exemplary accompaniment generator will try to select good chords to surround this chord, even if this wasn't the chord it "thinks" is best in this spot.

As described herein, right-clicking or otherwise selecting a chord can bring up a drop-down menu that allows a user to either explicitly change the selected chord (which preferably requires some musical knowledge) or access the list of "top ten" chords that the accompaniment generator recommends for a particular measure. This feature has particular usefulness to a novice or someone without musical knowledge because the user can experiment (i.e., "this sounds okay but not quite right, what else might work here?").

"My Song" Exemplary User Interface Locking Feature

Figure 10:
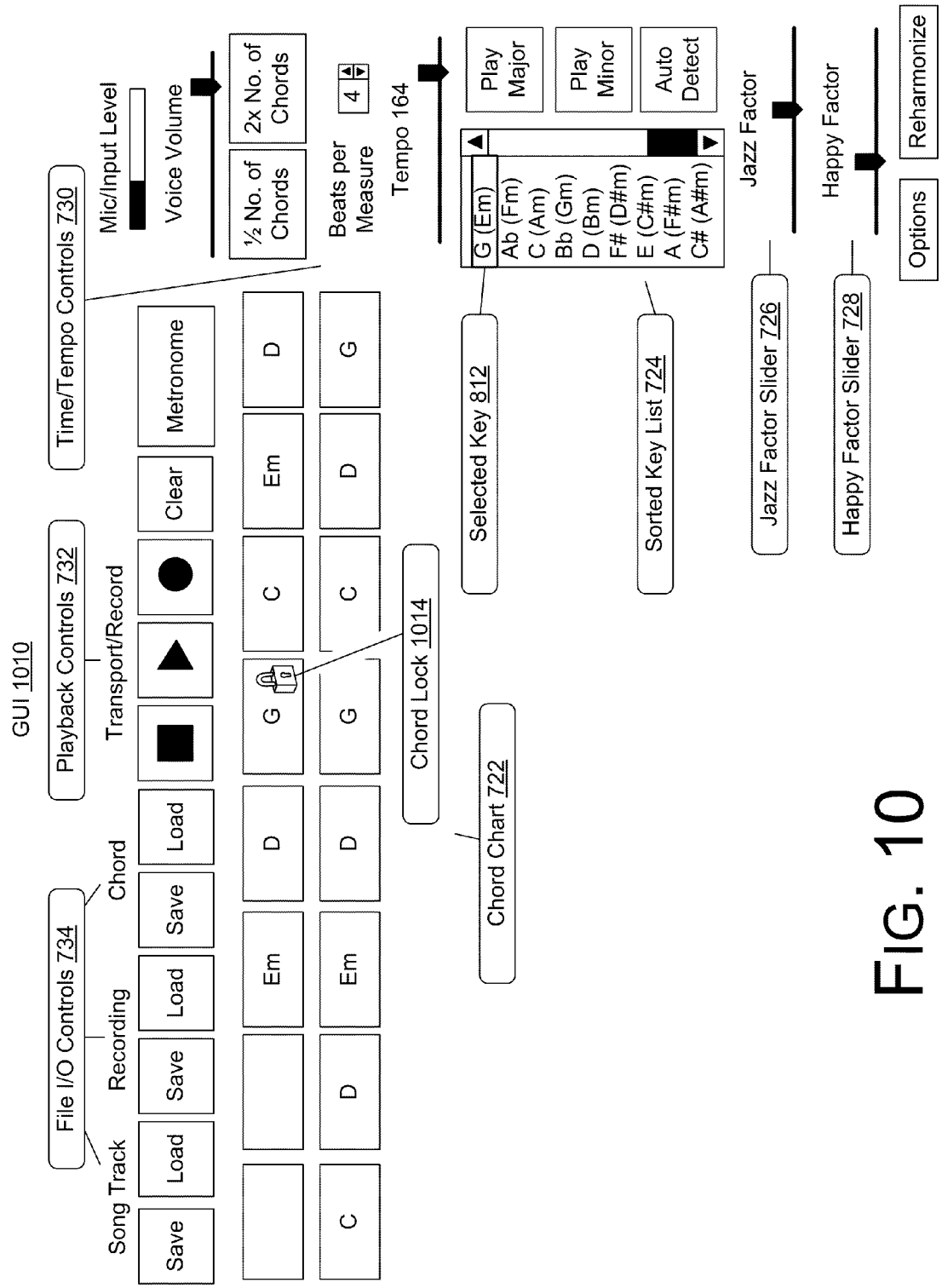
FIG. 10 is a diagram of an exemplary graphical user interface (GUI) for locking a chord of a harmonized recorded melody.

FIG. 10 shows a screen shot of an exemplary GUI 1010. In this example, a lock feature is applied to lock a chord in place (e.g., the third chord, which appears with a "lock" icon). In this example, an associated accompaniment generator was instructed to reharmonize the melody and in response it changed a bunch of chords to best accommodate the locked chord. This feature is particularly useful for a user that really likes a certain chord but still wants to play with the sliders or otherwise adjust the feel of the song.

As described herein, the "lock" item in the drop-down menu 912 of FIG. 9 allows a user to say "don't change this chord" (i.e., to instruct the accompaniment generator to not change a chord). When a chord is "locked", further manipulation of the jazz/happy sliders will not change this chord, yet neighboring chords will take the locked chord into account upon reharmonization. Further, even if a locked chord is not the accompaniment generators top choice (i.e., My Song's "favorite"), it will select sensible transitions in and out of this locked chord.

Exemplary Count-In Feature

An exemplary count-in feature allows a user to press "record" in a GUI and, in response, a metronome counts 1-2-3-4 and again 1-2-3-4 to allow better the user to commence singing. In other words, this feature provides, for example, a two-measure count-in period. This feature may allow a user to adjust as desired the count-in, for example, none to more than two measures. Usually when a user is singing, the user will not sing anything during this period, in which case the user would like to just throw those two measures out, since these measures are not really part of the song. However, some songs have a "pickup" beat (or more), where a user sings a little bit in the measure before the song really starts. For example, the famous Beatles song "Let it Be" begins as follows: 1, 2, 3, 4 "(when I) FIND myself in times of trouble . . . ". In this example, the first beat of the song, in a logical phrasing sense, is "FIND", but a user really starts singing on the last half-beat of the previous measure ("when I"). A system should not discard this audio yet, on the other hand, the system also does not necessarily want to just make the first measure of the song incorrectly, especially because, as described above, the first measure of a song often has special properties as far as harmonization and phrasing. Consequently, it can be quite helpful to put the first measure in the right place (in this case, the measure starting on "FIND"). An exemplary method accomplishes this task as follows:

1. When the user clicks "record", capture all the audio for both of the "count-in" measures, which might or might not eventually be discarded;

2. Compute the average volume recorded during the first count-in measure, in which a system can be rather certain a user did not sing anything at all. This is basically a way of measuring ambient noise (e.g., in the singer's room);

3. Compute the average volume in every individual beat of the second count-in measure, in which the user may or may not have included some pickup notes; and 4. If any beat in the second count-in measure has an average volume that is more than about four times the average volume in the first count-in measure, this is then labeled as having a high probability of being a pickup measure (i.e. it looks like the user sang something). In this instance, the system keeps the audio, but as always, treats the next measure (the first measure after the count-in) as the first "real" measure in the song.

Note that in the right-click menu 912 shown in FIG. 9, a user can also convert measures to pickups or vice verse after the fact if a user does not like what an associated accompaniment generator interpreted from the user's audio. Similarly, at the end of a song, if a user accidentally lets the recording run for a few seconds before clicking "stop", a user can turn measures into "trailing measures" using the GUI 910. This is again to allow the last measure that a user really wants as part of the song to be treated specially by the harmonizer.

Phrase Modeling

Various exemplary features may be added to a system. For example, a harmony modeler can incorporate a higher-level notion of "phrases", or sets of chords that are musically grouped together. This allows enforcement of a reasonable level of repetition in any resulting output, which is common in pop music, and allows for incorporation of common chord patterns or forms that are longer than two chords. For example, consider the following exemplary approaches to phrase modeling.

Mining an original database for both common chord patterns (e.g. C major, G major, A minor, F) and common chord forms (e.g. XYXZ, where 'X', 'Y', and 'Z' can be any chord). An exhaustive approach to this mining can be taken if a finite pattern length is assumed (i.e. can look at the entire database and find all sequences of chords of length 1 to k and see which are the most common). In this approach, the database can be partitions into major and minor sub-databases.

An exemplary modeling approach can incorporate a two-layer Hidden Markov Model, where the lower layer runs as described above, and a higher-level state either indicates whether (i) currently not in a chord progression or (ii) which chord progression currently in. There is a likelihood penalty for not being in a chord progression, to encourage (but not require) chord progressions. When such an approach determines that it is in a chord progression, chords that follow the progression can be assigned a much higher probability, although substitutions can be allowed (e.g., with a penalty). Overall such a method can proceed according to the approach described above, using the Viterbi algorithm to find the best-fit sequence of states (at both model levels) to an input melody.

Note Features

In an exemplary approach all notes in a measure can be assembled together into a melody observation vector, so that the only feature of a note that affects its impact on the observation vector is duration. As an alternative, an exemplary note feature can handle melodies in a more information rich observation vector and handle an appropriately more sophisticated melody representation. Additional exemplary melody observation features can include:

Note timing (i.e., notes that are on a downbeat can optionally be deemed more important);

Note order (i.e., the first note in a measure can optionally be deemed more important than others); and Intervals (i.e., if the melody makes a large jump to reach a note, that note can optionally be deemed more important than others).

Mode Modeling

As described above, a database is separated into major and minor sub-databases, to allow modeling of the major and minor "modes". Other modes are also frequent in pop music, in particular the "blues mode". An exemplary technique optionally gathers additional data and optionally performs some automatic clustering to allow for incorporation of more modes than just major and minor.

Genre Modeling

As described above, a system may use a single database for training a harmony modeler. As described herein, training of a model may occur using one or more genre-specific databases, which can allow genre-specific accompaniments later. Such an approach can also allow for mixing of genres. An exemplary method trains a model using a variety of genre-specific databases (a jazz database, a pop database, a country database, etc.) and then allows a user to select a genre and optionally find the best-fit genre for a given melody by iterating over the matrices built from each genre on which the model was trained.

Key Changes

As described above, a system may assume that an input melody is in a single key and thus prevent a change in key. An exemplary method looks for regions of a melody that are not fitting the model well and attempts to fit those regions to other keys, optionally biasing the selection of a new key based on key changes that are observed to be common in an input database.

Dynamic Self-Transition Weighting

As explained above, a method may explicitly assign a very low probability to self-transitions, to avoid long sequences of repeating chords. Such an approach has the potential drawback of not allowing chords to repeat when they should repeat; this is particularly common at phrase boundaries. An exemplary method provides one or more alternatives such as:

Allow self-transitions up to a preset limit (e.g. 2 self-transitions per 10 measures);

Dynamically adjusting a self-transition weight by looking for cases when the transition model overwhelms the observation model in the likelihood computation at a given measure and down-weighting the transition matrix if this happens too frequently; and Allowing self-transitions at phrase boundaries only, which can depend on having implemented either an automatic or manual system for identifying phrase boundaries.

Exemplary User Interfaces: Video Capture

A target market for an exemplary automatic accompaniment application is the group of users wishing to post their compositions online. Thus, referring to the recording device 208 of FIG. 2, such a device may include video capabilities. For example, an exemplary automatic accompaniment application can include a video-capture feature that automatically captures data from an available camera when audio is recorded, along with a video-export feature that will render the synthesized audio and the captured video/audio into a video file.

Exemplary User Interfaces: Transposition

As described above, a generator typically finds the best-fit key for each melody, but if a user is halfway between two keys, the output will inevitably sound less than optimal. An exemplary method includes a pitch-shift to shift output (e.g., MIDI output) according to the optimal global shift learned in the preprocessing step described above.

Kalman Filtering

Describe above, an optimal global shift applies to all pitches in an input melody to best align it to a musical key. An exemplary approach includes an alternative approach, which uses a Kalman filter to gradually adjust a weight over time, for example, using the same metric—distance from nearest musical key—as an error metric for updating the Kalman filter. Such a feature can address issues related to pitch-tracking.

Using Chord Estimation for Pitch Tracking

An exemplary method includes determining a set of appropriate chords for a melody by using one or more pitch-tracking approaches that bias note selection toward notes that fit well with selected chords.

An exemplary accompaniment generator is optionally implemented or implementable in a game box, which may allow a user to generate music for a game (e.g., a lyrical character) and/or allow for distribution of such technology as a "mini-game".

Output Filtering Through an Accompaniment Enhancement System

As described herein, the output chords may be used to create a simple or a complex accompaniment. For example, chords can be broken into root notes and thirds and sevenths where a bass instrument plays the root notes and a piano instrument plays the thirds and sevenths of the chords as voicings. In another example, the output chords are used in combination with a product such as Band-in-a-box® (BIAB)

software (PG Music, Inc., Victoria, Canada), which allows a user to generate musical compositions. An exemplary accompaniment generator can use BIAB software or other similar software to produce an enhanced output. The BIAB software can accept a sequence of chords as input and produce a "fancy" MIDI accompaniment from those chords. An exemplary system can play back to a user such enhanced output and the user can adjust the various instruments using the BIAB software.

Exemplary Computing Device

Figure 11:
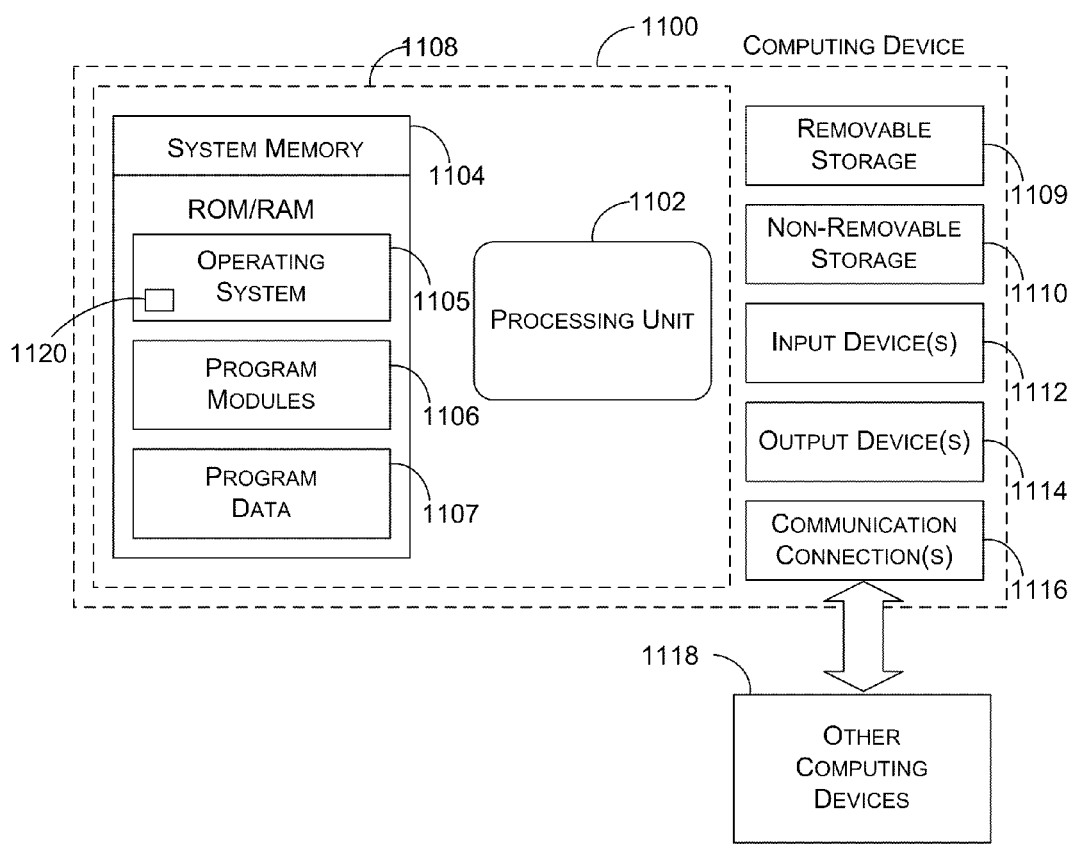
FIG. 11 is a diagram of various components of an exemplary computing device that may be used to implement part or all of various exemplary methods discussed herein.

FIG. 11 shows various components of an exemplary computing device 1100 that may be used to implement part or all of various exemplary methods discussed herein.

The computing device shown in FIG. 11 is only one example of a computer environment and is not intended to suggest any limitation as to the scope of use or functionality of the computer and network architectures. Neither should the computer environment be interpreted as having any dependency or requirement relating to any one or combination of components illustrated in the example computer environment.

With reference to FIG. 11, an exemplary system for implementing an exemplary character generation system that uses a features-based approach to conditioning ink data includes a computing device, such as computing device 1100. In a very basic configuration, computing device 1100 typically includes at least one processing unit 1102 and system memory 1104. Depending on the exact configuration and type of computing device, system memory 1104 may be volatile (such as RAM), non-volatile (such as ROM, flash memory, etc.) or some combination of the two. System memory 1104 typically includes an operating system 1105, one or more program modules 1106, and may include program data 1107. This basic configuration is illustrated in FIG. 11 by those components within dashed line 1108.

The operating system 1105 may include a component-based framework 1120 that supports components (including properties and events), objects, inheritance, polymorphism, reflection, and provides an object-oriented component-based application programming interface (API), such as that of the .NET™ Framework manufactured by Microsoft Corporation, Redmond, Wash.

Computing device 1100 may have additional features or functionality. For example, computing device 1100 may also include additional data storage devices (removable and/or non-removable) such as, for example, magnetic disks, optical disks, or tape. Such additional storage is illustrated in FIG. 11 by removable storage 1109 and non-removable storage 1110. Computer storage media may include volatile and nonvolatile, removable and non-removable media implemented in any method or technology for storage of information, such as computer readable instructions, data structures, program modules, or other data. System memory 1104, removable storage 1109 and non-removable storage 1110 are all examples of computer storage media. Thus, computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 1100. Any such computer storage media may be part of device 1100. Computing device 1100 may also have input device(s) 1112 such as keyboard, mouse, pen, voice input device (e.g., a microphone), touch input device, video input (e.g., a camera, a video camera), etc. Output device(s) 1114 such as a display, speakers, printer, etc. may also be included. These devices are well know in the art and need not be discussed at length here.

Computing device 1100 may also contain communication connections 1116 that allow the device to communicate with other computing devices 1118, such as over a network. Communication connection(s) 1116 is one example of communication media. Communication media may typically be embodied by computer readable instructions, data structures, program modules, etc. By way of example, and not limitation, communication media includes wired media such as a wired network or direct-wired connection, and wireless media such as acoustic, RF, infrared and other wireless media. The term computer readable media as used herein includes both storage media and communication media.

Various modules and techniques may be described herein in the general context of computer-executable instructions, such as program modules, executed by one or more computers or other devices. Generally, program modules include routines, programs, objects, components, data structures, etc. for performing particular tasks or implement particular abstract data types. These program modules and the like may be executed as native code or may be downloaded and executed, such as in a virtual machine or other just-in-time compilation execution environment. Typically, the functionality of the program modules may be combined or distributed as desired in various embodiments.

An implementation of these modules and techniques may be stored on or transmitted across some form of computer readable media. Computer readable media can be any available media that can be accessed by a computer. By way of example, and not limitation, computer readable media may comprise "computer storage media" and "communications media."

One skilled in the relevant art may recognize, however, that the techniques described herein may be practiced without one or more of the specific details, or with other methods, resources, materials, etc. In other instances, well known structures, resources, or operations have not been shown or described in detail merely to avoid obscuring aspects of various exemplary techniques.

While various examples and applications have been illustrated and described, it is to be understood that the techniques are not limited to the precise configuration and resources described above. Various modifications, changes, and variations apparent to those skilled in the art may be made in the arrangement, operation, and details of the methods and systems disclosed herein without departing from their practical scope.

What is claimed is:

1. A graphical user interface, implemented at least in part by a computing device, the graphical user interface comprising:
   one or more controls to harmonize and/or reharmonize a recorded melody;
   a chord chart to display chords selected by an accompaniment generator for harmonizing the recorded melody, the chords being selected by the accompaniment generator based on:
   blending chord transition matrices into a resultant chord transition matrix, the chord transition matrices comprising learned chord transition probabilities based on each chord in a set of songs;
   blending melody observation matrices into a resultant melody observation matrix, the melody observation matrices comprising learned note duration probabilities based on each note in each chord in the set of songs;

training a Hidden Markov Model using the resultant chord transition matrix and the resultant melody observation matrix; and using the Hidden Markov Model to select the chords based on the recorded melody.

2. The graphical user interface of claim 1, the chord transition matrices further comprising major-key and minor-key chord transition matrices and the melody observation matrices further comprising major-key and minor-key melody observation matrices.

3. The graphical user interface of claim 1, the chords being selected by the accompaniment generator further based on:

segmenting the recorded melody into segments;

performing a frequency analysis of the recorded melody, wherein the performing the frequency analysis comprises using an autocorrelation technique;

summing a total duration of each fundamental frequency within a segment;

based on the summing, computing a computed probability for possible chords for each segment, wherein the Hidden Markov Model selects the chords using the computed probabilities.

4. The graphical user interface of claim 1, further comprising:

a sorted key list that displays user selectable keys that identifies a key determined by the accompaniment generator that best fits the recorded melody, wherein when a different key of the user selectable keys is selected, when at least one of the one or more controls to harmonize and/or reharmonize the recorded melody is activated, the accompaniment generator reharmonizes the recorded melody using the different key to select new chords for display on the chord chart.

5. The graphical user interface of claim 1, further comprising:

a control to lock one or more of the chords in the chord chart, wherein when one or more of the chords in the chord chart are locked, when at least one of the one or more controls to harmonize and/or reharmonize the recorded melody is activated, the accompaniment generator reharmonizes the recorded melody by best accommodating the one or more locked chords without altering the one or more locked chords.

6. The graphical user interface of claim 3, wherein a hidden node of the Hidden Markov Model represents one segment and wherein observed data comprises a histogram of pitch values.

7. The graphical user interface of claim 1, the chords being selected by the accompaniment generator further based on blending one or more transition matrices with the resultant chord transition matrix, wherein each of the one or more transition matrices corresponds to a musical genre.

8. The graphical user interface of claim 1, further comprising:

one or more controls to control the blending of the chord transition matrices and/or the blending of the melody observation matrices.

9. The graphical user interface of claim 1, wherein when a chord in the chord chart is selected and replaced with a different chord, when instructed, the accompaniment generator reharmonizes the recorded melody using the different chord, whereby the different chord is selectable from a displayable list of one or more chords recommended by the accompaniment generator.

10. One or more computer-readable storage media having stored thereon computer-executable instructions for implementing a graphical user interface that, when executed by at least one processor, perform operations comprising:

displaying a control to harmonize and/or reharmonize a recorded melody;

displaying, in a chord display, chords selected by an accompaniment generator after harmonizing or reharmonizing the recorded melody the chords being selected by the accompaniment generator based in part on:

blending chord transition matrices into a resultant chord transition matrix, the chord transition matrices comprising learned chord transition probabilities based on each chord in a set of songs;

blending melody observation matrices into a resultant melody observation matrix, the melody observation matrices comprising learned note duration probabilities based on each note in each chord in the set of songs;

training a Hidden Markov Model using the resultant chord transition matrix and the resultant melody observation matrix;

displaying a control to lock one or more of the chords in the chord display;

displaying a sorted key list that displays user selectable keys that identifies a key determined by the accompaniment generator that best fits the recorded melody.

11. The one or more computer-readable storage media of claim 10, wherein:

when one or more of the chords in the chord display are locked, when instructed, the accompaniment generator reharmonizes the recorded melody by best accommodating the one or more locked chords without altering the one or more locked chords;

when a different key of the user selectable keys is selected, when instructed, the accompaniment generator reharmonizes the recorded melody using the different key to select new chords for display on the chord display; and when a chord in the chord display is selected and replaced with a different chord, when instructed, the accompaniment generator reharmonizes the recorded melody using the different chord.

12. The one or more computer-readable storage media of claim 11, wherein the different chord is selected from one or more chords recommended by the accompaniment generator.

13. A graphical user interface, implemented at least in part by a computing device, the graphical user interface comprising:

a chord chart to display chords selected by an accompaniment generator for harmonizing a recorded melody, the chords being selected by the accompaniment generator based on:

blending chord transition matrices into a resultant chord transition matrix, the chord transition matrices comprising learned chord transition probabilities based on each chord in a set of songs;

blending melody observation matrices into a resultant melody observation matrix, the melody observation matrices comprising learned note duration probabilities based on each note in each chord in the set of songs;

training a Hidden Markov Model using the resultant chord transition matrix and the resultant melody observation matrix; and using the Hidden Markov Model to facilitate selection of the chords;

one or more controls for adjusting a jazz factor to control a melody observation weight used by the accompaniment generator for biasing chord sequences used for harmonizing the recorded melody; and a sorted key list that displays user selectable keys that identifies a key determined by the accompaniment generator that best fits the recorded melody.

14. The graphical user interface of claim 13, further comprising:

one or more controls to control the blending of the chord transition matrices and/or the blending of melody observation matrices.

15. The graphical user interface of claim 13, further comprising:

a control to lock one or more of the chords in the chord chart; and a control to reharmonize the recorded melody without altering the one or more locked chords.

16. The graphical user interface of claim 13, further comprising:

a control to lock one or more of the chords in the chord chart; and a control to reharmonize the recorded melody by best accommodating the one or more locked chords.

17. The graphical user interface of claim 13, wherein:

when a different key of the user selectable keys is selected, when instructed, the accompaniment generator uses the different key to select new chords for harmonizing the recorded melody; and when a chord in the chord chart is selected and replaced with a different chord, when instructed, the accompaniment generator reharmonizes the recorded melody using the different chord.

18. The graphical user interface of claim 17, wherein the different chord is selected from one or more chords recommended by the accompaniment generator.

19. The graphical user interface of claim 13, wherein when one or more chords in the chord chart are selected and replaced with one or more different chords, when instructed, the accompaniment generator reharmonizes the recorded melody using the one or more different chords.

20. The graphical user interface of claim 13, wherein adjusting the jazz factor biases chord sequences relative to a fit to individual notes of the recorded melody.

* * * * *